Aug. 23, 1949.  J. MARTIN  2,479,755

DEMOUNTABLE VACUUM TUBE

Filed Aug. 2, 1946

INVENTOR
JEAN MARTIN
By John Q. Brady
attorney

Patented Aug. 23, 1949

2,479,755

UNITED STATES PATENT OFFICE 2,479,755

DEMOUNTABLE VACUUM TUBE

Jean Martin, Paris, France, assignor to Societe Francaise Radio-Electrique, a corporation of France Application August 2, 1946, Serial No. 688,036
In France July 5, 1945

Section 1, Public Law 690, August 8, 1946
Patent expires July 5, 1965

2 Claims. (Cl. 250—27.5)

The present invention relates to demountable vacuum tubes.

It has heretofore been proposed, in order to construct sealed joints which can be readily demounted, on the one hand, to place these joints between metallic parts of the tube, the said parts being permanently sealed beforehand in the glass material of the tube, and on the other hand to adopt, for the metallic parts to be assembled, suitable geometric forms so as to ensure the centering and appropriate angular positioning of the assembly.

My invention is directed to a simplified construction of sealed joint for the metallic parts of demountable tubes in which sufficient elasticity is maintained at the joint to eliminate danger of rupture of the sealed joint under conditions of shock vibration.

My invention will be more fully understood from the specification hereinafter following by reference to the accompanying drawing, in which.

Figure 1A:
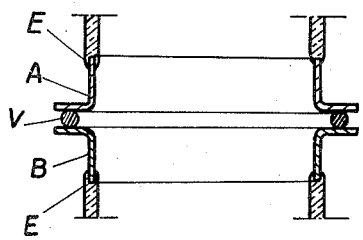
Figs. 1a, 1b and 1c show cross sectional views of conventional forms of sealed joints for demountable vacuum tubes but which do not contain the benefits of the shock protection afforded by the structure of my invention.
Figure 1B:
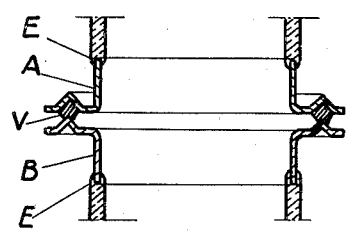
Figure 1C:
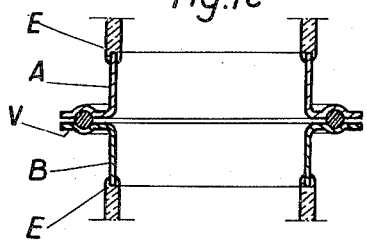

The geometric forms which have heretofore been proposed can be derived, in fact, from one of the profiles diagrammatically represented in Figs. 1a, 1b, 1c, where A and B indicate the metallic parts to be assembled, which are generally formed from ferro-nickel alloy V designates the sealing substance, either glass or brazing solder, which is soldered in a tight manner to be pieces A and B. In these examples, the parts A and B possess no sufficient resilience for compensating for the mechanical stresses which would occur during the heating of the pieces, at the level of the metal-glass weld E, and of the metal-metal weld V.

According to the present invention, it is provided through the choice of suitable profiles, that a sufficient resilience be insured for the metallic pieces to be assembled in a demountable manner. To this end, these metallic pieces are formed in such manner that they fit into one another, and their extreme edges are designed to register opposite each other after the placing of all parts of the assembly in position; the solder, which would be removed for the dismantlement of the tube, is then applied, externally of the tube, and following the extreme edges of the two metallic pieces. This external location of the solder offers inter alia, the advantage of permitting the easy formation and control of the soldering.

Figure 2A:
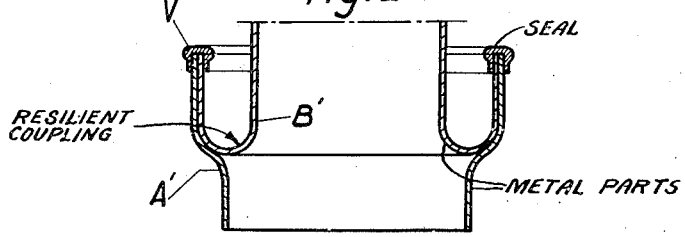
Fig. 2a illustrates in cross section the preferred form of my invention showing a sealed joint for the metallic parts of a tube with protection against shock vibration.
Figure 2B:
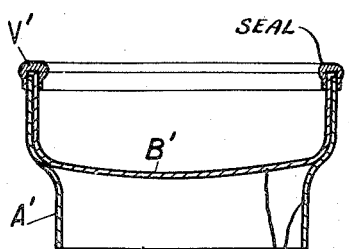
Fig. 2b shows a modified form of shockproof sealed joint for high-powered tubes embodying the principles of my invention.
Figure 2C:
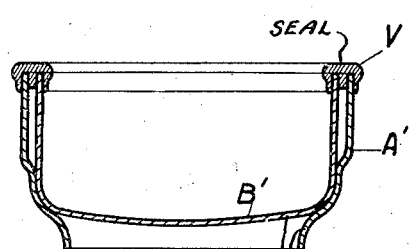
Fig. 2c shows a further modified form of shock protected sealed joint for high-powered tubes constructed in accordance with my invention.

Figs. 2a, 2b, 2c show, by way of nonlimitative examples, the cross-sectional views of three demountable closure arrangements according to the enunciated principle of my invention. The metallic pieces to be assembled i. e. A' and B', are machined in the form of cylindrical rings capable of fitting into each other, either over the whole length of the edges thereof (Figs. 2a and 2b) or over only a part of the profiles thereof (Fig. 2c); the tight solder between the opposite edges of the two pieces is obtained by applying against these edges a ring V' in glass or brazing solder, of suitable dimensions, extending slightly beyond either side of these edges; then the pieces A' and B' are heated either with a blow pipe, or through induction, until ring V' is fused to a just sufficient degree for coating the edges of the pieces A' and B'.

During the demounting of the joint, there is effected the fusion by heating with the blow pipe or through induction, of the substance V' which coats "astride" the edges of the pieces A' and B' and the piece B' will be removed from piece A'. For mounting up the assembly again, it will only need to clean the two pieces A' and B' and to begin again a new soldering procedure as before.

While I have described my invention in certain of its preferred embodiments I realize that changes may be made in the structure and I desire it to be understood that no limitations upon my invention are intended other than may be imposed by the scope of the appended claims.

What I claim is:

1. A demountable vacuum device comprising a pair of substantially cylindrical metallic parts forming parts of the wall of the said device, said metallic parts being directed toward each other, one of said metallic parts being folded outwardly upon itself and terminating in a raw peripheral edge, the other of said metallic parts having an enlarged end section and embracing the external portion of the folded end of said first mentioned part and terminating in a raw edge adjacent said first mentioned raw edge, and a seal interconnecting the raw edges of said parts.

2. A demountable vacuum device, comprising a pair of closure members forming parts of the wall of said device, said closure members terminating in substantially circular metallic portions, one of said metallic portions having the end section thereof enlarged in diameter and the other of said metallic portions having the end section thereof folded outwtardly upon itself providing yieldable end section establishing an external surface connection with the internal surface of said first mentioned end section of enlarged diameter and forming a resilient coupling between said metallic parts, and a seal interconnecting the adjacent peripheral edges of said metallic parts.

JEAN MARTIN.

REFERENCES CITED

The following references are of record in the file of this patent:

UNITED STATES PATENTS

| Number | Name | Date |
|---|---|---|
| 1,779,311 | Gates | Oct. 21, 1930 |
| 2,254,853 | Mouromtseff et al. | Sept. 2, 1941 |
| 2,317,442 | Chevigny | Apr. 27, 1943 |

FOREIGN PATENTS

| Number | Country | Date |
|---|---|---|
| 469,978 | Great Britain | Aug. 6, 1937 |